US009545898B2

(12) United States Patent
Caillot et al.

(10) Patent No.: US 9,545,898 B2
(45) Date of Patent: Jan. 17, 2017

(54) CONNECTOR OR ADAPTOR FOR A WINDSCREEN WIPING SYSTEM, IN PARTICULAR OF A MOTOR VEHICLE

(71) Applicant: Valeo Systèmes d'Essuyage, Le Mesnil Saint Denis (FR)

(72) Inventors: Gérald Caillot, Cernay la Ville (FR); Denis Thebault, Clermont Ferrand (FR); Jean-Michel Jarasson, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 118 days.

(21) Appl. No.: 14/494,876

(22) Filed: Sep. 24, 2014

(65) Prior Publication Data

US 2015/0089766 A1    Apr. 2, 2015

(30) Foreign Application Priority Data

Sep. 30, 2013  (FR) ..................................... 13 59394

(51) Int. Cl.
*B60S 1/40* (2006.01)
*B60S 1/38* (2006.01)
*B60S 1/52* (2006.01)

(52) U.S. Cl.
CPC ............ *B60S 1/4064* (2013.01); *B60S 1/3849* (2013.01); *B60S 1/3868* (2013.01); *B60S 1/4048* (2013.01); *B60S 1/3805* (2013.01); *B60S 1/3851* (2013.01); *B60S 1/3856* (2013.01); *B60S 1/3862* (2013.01); *B60S 1/524* (2013.01); *B60S 2001/4054* (2013.01)

(58) Field of Classification Search
CPC ..... B60S 1/4064; B60S 1/3868; B60S 1/4048; B60S 2001/4054
USPC ............................ 15/250.31, 250.32, 250.43
See application file for complete search history.

(56) References Cited

FOREIGN PATENT DOCUMENTS

| BE | WO 2011026507 A1 | * | 3/2011 | ............ B60S 1/3851 |
| DE | WO 2011088977 A1 | * | 7/2011 | ............ B60S 1/3805 |
| DE | EP 2460700 A1 | * | 6/2012 | ............ B60S 1/3862 |
| FR | WO 2012072302 A1 | * | 6/2012 | ............ B60S 1/3862 |

* cited by examiner

*Primary Examiner* — Michael Jennings
(74) *Attorney, Agent, or Firm* — Osha Liang LLP

(57) ABSTRACT

A connector for a windscreen wiper of a motor vehicle, the connector being configured to allow the wiper to be articulated to an arm for driving the wiper in a rotational movement about an axis of rotation Y. The connector includes one or more projecting shapes which are configured to be guided in rotation by an adaptor for the wiper on the arm in various angularly distant regions about the axis of rotation Y, so as to allow the movement in rotation.

5 Claims, 2 Drawing Sheets

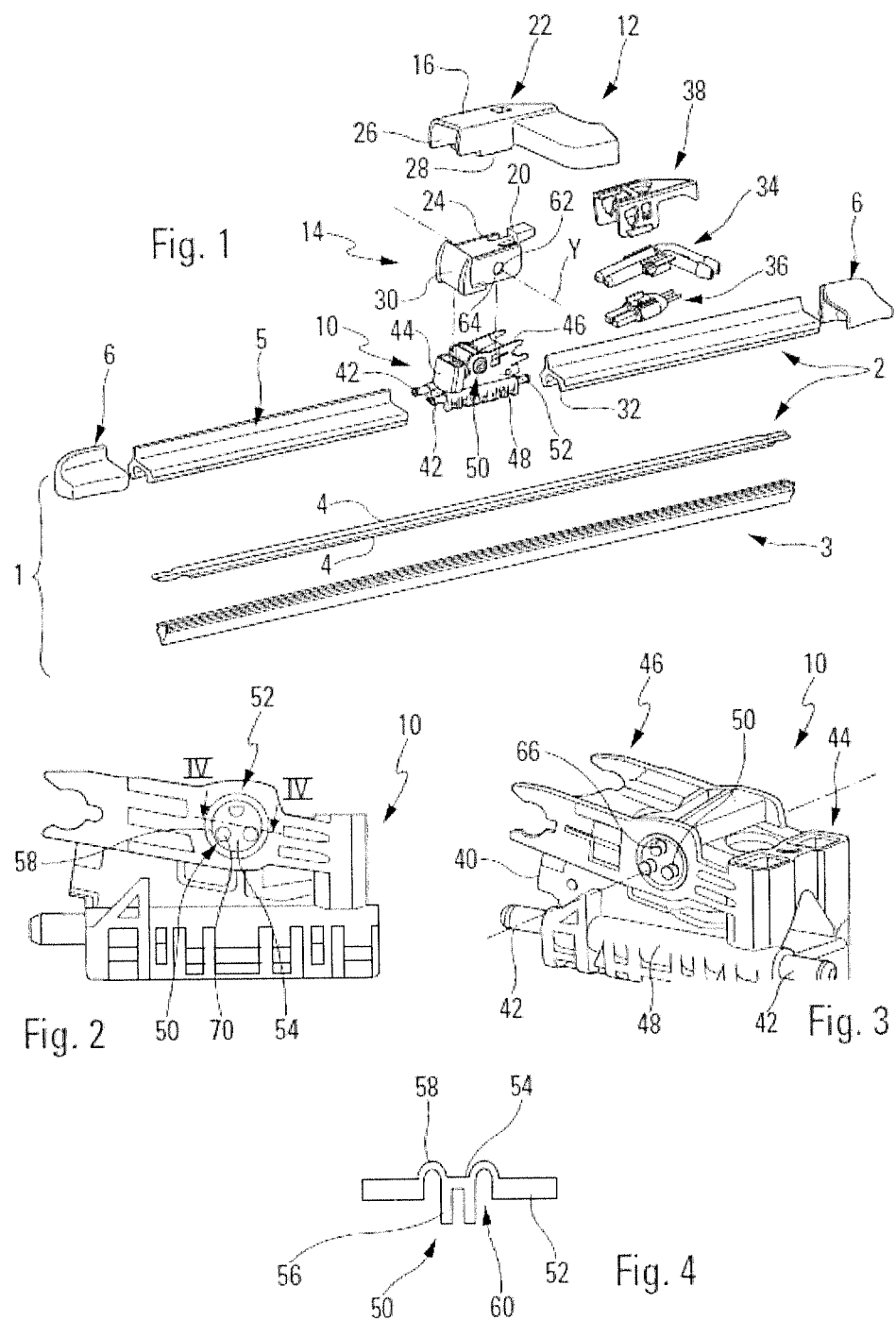

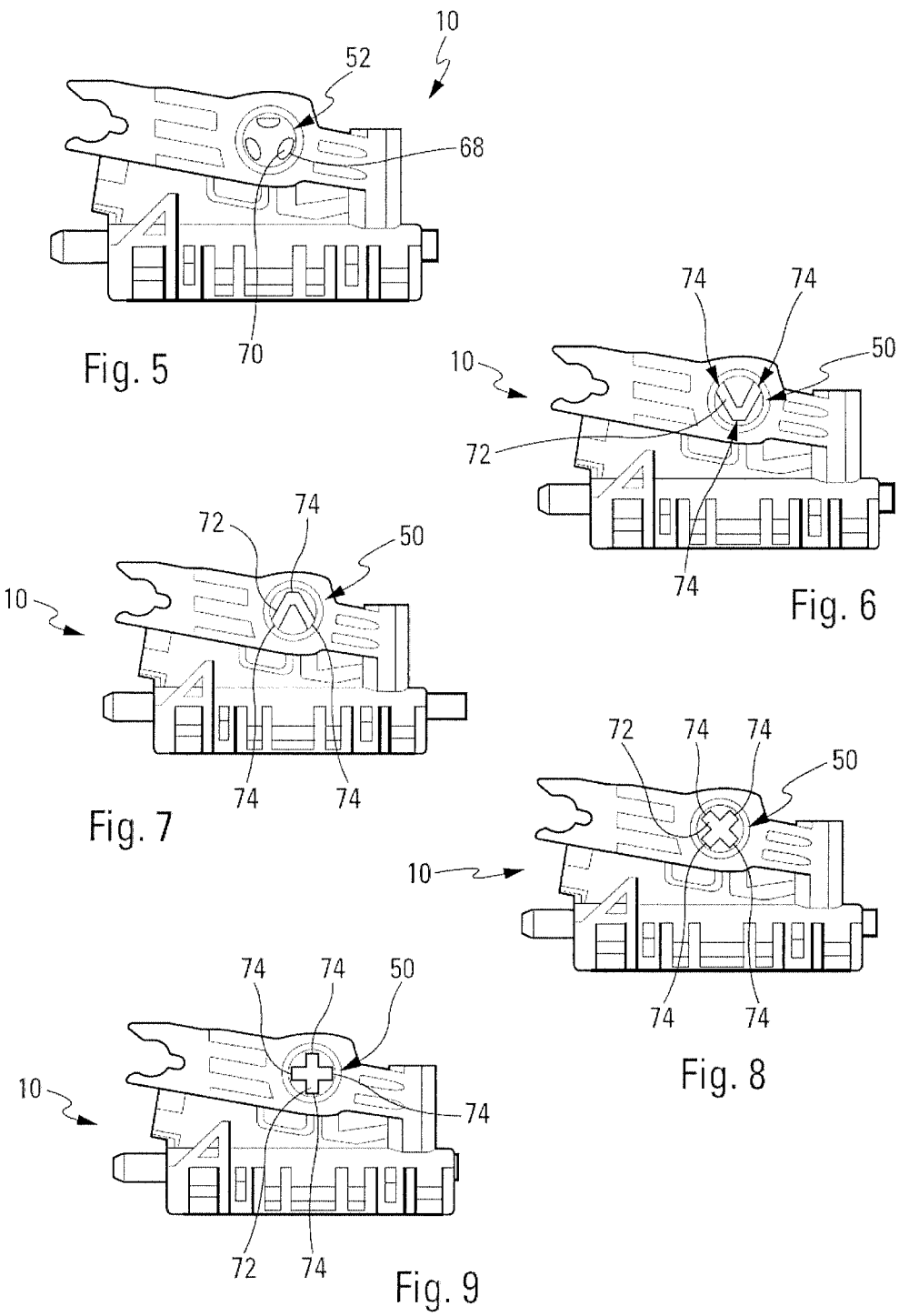

_US 9,545,898 B2_

CONNECTOR OR ADAPTOR FOR A WINDSCREEN WIPING SYSTEM, IN PARTICULAR OF A MOTOR VEHICLE

The field of the present invention is that of equipment for vehicles, and more particularly that of equipment for wiping the windows of motor vehicles.

Motor vehicles are commonly equipped with windscreen wiper systems for washing the windscreen and avoiding disruption to the driver's view of his surroundings. These windscreen wipers are conventionally driven by arms or wiper holders that carry out an angular to-and-fro movement and have elongate wipers which themselves carry squeegee blades made of a resilient material. These blades rub against the windscreen and evacuate the water, removing it from the driver's field of view. In a recent version, known as the "flat blade" version, the wipers comprise a semi-rigid assembly which holds the squeegee blade along its entire length.

It is known to articulate the wiper to the arm in rotation about an axis of rotation perpendicular to the plane which passes through the wiper and is orthogonal to the windscreen. Attachment devices comprising a connector secured to the wiper and a connector by means of which it is possible to removably mount the wiper on the arm, such that the wiper can be changed in the event of wear, are in particular known. The connector is mounted on the adaptor by means of a pivoting connection allowing the wiper to be articulated on the arm about the axis of rotation mentioned above.

Said pivoting connection is obtained by means of a peg of circular cross section, connected to the connector, engaging with an orifice of corresponding shape provided in each of the lateral faces of the adaptor. Such an articulation has high friction. Moreover, it requires the use of a quantity of material likely to cause moulding difficulties.

The invention sets itself the task of solving the above problems and relates to a connector for a windscreen wiper, in particular of a motor vehicle, said connector being configured to allow said wiper to be articulated to an arm for driving said wiper in a rotational movement about an axis of rotation.

According to the invention, said connector comprises one or more projecting shapes which are configured so as to be guided in rotation by an adaptor for said wiper on said arm in various angularly distant regions about said axis of rotation, so as to allow said movement in rotation.

By providing guiding in rotation between the connector and the adaptor acting via various regions thus distributed in a discrete, non-continuous manner about said axis of rotation, the friction between these two parts is reduced. This makes it easier to manage the clearance between these parts. Moreover, the quantities of material used are reduced.

According to various embodiments of the invention, which may be considered together or separately:

said projecting shapes are made in one piece with said connector,
said connector comprises a lateral surface designed to be oriented transversely to said axis of rotation,
said projecting shapes are made in one piece with said lateral surface,
said projecting shapes are made in one piece with a surface set back from said lateral surface such that said projecting shapes have a bearing portion designed to be in contact with said adaptor and remote from said set-back surface,
said connector comprises a channel between said lateral surface and said set-back surface,
the or said projecting shapes are configured so as to be guided by a circumferential wall of an orifice of said adaptor, said axis of rotation being designed to pass through said orifice which, advantageously, is provided so as to be circular and/or centred on said axis of rotation,
said projecting shapes comprise pegs, advantageously cylindrical pegs,
said pegs are of circular cross section, said pegs being configured so as to be tangential to said circumferential wall,
said pegs are of elongate cross section, one portion of a contour of said pegs being configured so as to follow an angular portion of said circumferential wall,
at least one of said pegs has a distal end comprising a chamfer,
said projecting shapes comprise one or more branches having ends designed to come to face angularly distant regions of said circumferential wall,
the or said branches are designed to follow a chord of said orifice, in particular so as to form a V,
the or said branches are designed to follow a diameter of said orifice, in particular so as to form an X,
said projecting shapes, in particular said pegs, occupy angular portions separated by angular portions having no projections.

The invention also relates to a wiper provided with a connector as described above.

Said wiper may comprise a stiffening core and a squeegee blade, said core providing said blade with curvature so as to facilitate the application of said blade on the windscreen. Said wiper may also comprise a clip for attaching said stiffening core and said squeegee blade, located at each longitudinal end of the wiper. In other words, said wiper is advantageously of the flat blade type.

The means of the invention may equally be transferred to the adaptor.

The invention thus also relates to an adaptor for a windscreen wiper, in particular of a motor vehicle, said adaptor being configured to allow said wiper to be articulated to an arm for driving said wiper in a rotational movement about an axis of rotation.

According to the invention, said adaptor comprises one or more projecting shapes which are configured so as to be guided in rotation by a connector, secured to said wiper, in various angularly distant regions about said axis of rotation, so as to allow said movement in rotation.

Said projecting shapes may have all or some of the features mentioned above in relation to the projecting shapes created on the connector.

Said adaptor may be configured to allow said wiper to be removably attached to said arm such that it can be replaced, in particular in the event of wear.

The invention also relates to a wiping system comprising a wiper or an adaptor as described above.

The invention will be better understood, and other aims, details, features and advantages thereof will emerge more clearly in the following detailed explanatory description of several embodiments of the invention, provided as purely illustrative and non-limiting examples, with reference to the appended schematic drawings.

In these drawings:

FIG. 1 is an exploded perspective view of an example of a wiping system to which the invention applies;

FIG. 2 is a front view of a first variant embodiment of a connector according to the invention;

FIG. 3 is a perspective view of the connector of FIG. 2;

FIG. 4 schematically shows the connector of FIG. 2 in a sectional view, along the line of section IV-IV in FIG. 2;

FIG. 5 is a front view of a second variant embodiment of a connector according to the invention;

FIG. 6 is a front view of a third variant embodiment of a connector according to the invention;

FIG. 7 is a front view of a fourth variant embodiment of a connector according to the invention;

FIG. 8 is a front view of a fifth variant embodiment of a connector according to the invention;

FIG. 9 is a front view of a sixth variant embodiment of a connector according to the invention.

In these drawings, identical reference numbers are used to denote identical or similar elements.

As shown in FIG. 1, the invention relates to a windscreen wiping system for a vehicle, in particular a motor vehicle. Said system is advantageously designed to follow an angular to-and-fro movement by means of which the water and/or other undesirable elements covering the windscreen may be evacuated.

Said wiping system comprises a wiper 1 for wiping said windscreen. This is for example a flat wiper, that is to say of the type comprising a stiffening core 2 and a squeegee blade 3, in particular made of rubber. Said stiffening core 2 provides said squeegee blade 3 with curvature so as to facilitate the application of said squeegee blade on the windscreen.

According to the embodiment shown, said stiffening core 2 comprises two vertebrae 4 located in respective channels created in said squeegee blade 3.

According to one variant, not shown, said stiffening core comprises a body having a single vertebra located in a housing created in said body, along the length of the wiper.

Said wiper 1 may also comprise an aileron 5 designed to improve the operation of the wiping system. More precisely, the purpose of the aileron 5 is to improve the wiper pressure on the windscreen and thus the aerodynamic performance of the system.

Said wiper 1 may further comprise end pieces or clips 6 for attaching said stiffening core 2, said squeegee blade 3, and/or said aileron 5, said clips being located at each of the longitudinal ends of the wiper 1.

In order that it may be mounted on an arm 12 of said wiping system, said wiper 1 comprises a connector 10, referred to here as the mechanical connector, which permits said wiper 1 to be articulated to the arm 12, allowing said wiper 1 to be driven. The articulation of the wiper 1 to the arm 12 is an articulation in rotational movement about an axis of rotation Y. The wiper must in effect have at least one degree of freedom in rotation with respect to said arm, and more specifically with respect to an end part or portion 16 of said arm 12, in order that the wiper can follow the curvature of the window to be wiped. Said mechanical connector 10 is for example fixed to said stiffening core 2 of the wiper 1, in particular by crimping. Said connector 10 is, for example, moulded. In particular, it is made of plastic.

Said system also comprises an adaptor 14, mounted in a freely articulated manner on said mechanical connector 10 about said axis of rotation Y. Said adaptor 14 is, for example, moulded. In particular, it is made of plastic. The mechanical connector 10, which bears the wiper, is in this case designed to be inserted into the clevis forming the adaptor 14.

Said adaptor 14 is advantageously configured so as to allow the wiper 1 to be mounted on—and removed from—the arm 12. More precisely, the adaptor 14 may be inserted into the end part 16 by means of a translational movement along a longitudinal axis of extent of said end part 16, so as to come into the position of use in which it abuts against the end part 16 in which it is reversibly attached by means of a retractable locking button 20 which engages with a cavity 22 created for that purpose in the upper portion of the end part 16. In that position, said end part 16 covers the adaptor 14. The retractable button 20 and the cavity 22 are in this case provided in the upper portion, respectively of said adaptor 14 and of said end part 16, said button 20 being located at a distal end of a flexible tab 24. Numerous locking variants are possible.

The end part 16 of the drive arm 12 is for example in the shape of an upside-down "U", with the opening of this "U" shape facing the windscreen. The clevis shape of the adaptor 14 is externally complementary with the internal volume of the end part 16, so as to come to lodge in the latter. When the wiper 1 is installed in the drive arm 12, the adaptor 14 is inserted into said end part 16 via an opening 26 provided at the distal end thereof and is guided by rims 28 of its lateral flanks which are oriented towards the inside of said end part 16. Here, the adaptor 14 has an end 30, termed a cap, which closes the distal end of the arm 12.

The system in accordance with the invention further comprises, in this case, a device for spraying the windscreen from said wiper 1.

Said spraying device comprises, for example, ducts 32 created in the stiffening core 2 and/or the squeegee blade 3, said ducts 32 making it possible to distribute the cleaning liquid inside the wiper 1 to spraying nozzles, not shown, distributed along the length of said wiper 1, in this case along either side thereof so as to allow the liquid to be sprayed in the downstream or upstream direction, whatever the direction of rotation of the arm 1. Said spraying device further comprises a hydraulic connector 34 which supplies the wiper 1 from one or more conduits, not shown, in which said liquid circulates.

Said wiping system may further comprise a device for heating the spraying liquid. Said heating device comprises for example one or more heating electrical wires, not shown, which are located in the wiper 1, and an electrical connector 36, powering the or said heating wires, said mechanical adaptor 10 being configured so as to allow said electrical adaptor 36 to be plugged in and connected to said heating wires.

In order to facilitate the installation of the wiper 1 in the arm 12, said system may also comprise a guide 38 positioning said hydraulic connector 34 and/or electrical connector 36 between said arm 12 and said wiper 1, more particularly in order to make it easier to plug said hydraulic connector 34 and/or electrical connector 36 into said mechanical connector 10 during a wiper change.

In the case of a wiping system having such a spraying device, said connector 10 may comprise hydraulic connections 40, shown more clearly in FIG. 3, which are designed to engage with the hydraulic connector 34, and/or with end pieces 42, designed to engage with the stiffening core 2 and/or the squeegee blade 3 so as to allow the wiping liquid to circulate from said hydraulic connector 34 towards the arm 1. In this case, two of said end pieces 42 are provided at each longitudinal end of said connector 10, in order to supply the cleaning liquid distribution ducts 32. Said end pieces 42 are connected two by two from one longitudinal end of the connector to the other via conduits 48 of said connector 10. The latter may also comprise:

one or more electrical connections by means of which it is possible to connect the heating wire or wires of the wiper, and/or one or more flanges 46 for attaching the hydraulic connector 34 and/or the electrical connector 36.

According to the invention, said connector 10 comprises one or more projecting shapes 50, which are configured so as to be guided in rotation by the adaptor 14 in various angularly distant regions about said axis of rotation, so as to permit said movement in rotation. Considered in combination, said projecting shapes 50 thus act as a pivot for articulating the connector 10 in rotation on the adaptor 14 while limiting the regions of contact for said articulation.

Said projecting shapes 50 are advantageously made in one piece with said connector 10. The latter has, for example, a substantially parallelepipedal shape and said projecting shapes 50 are located, in particular, in a median portion of opposite lateral surfaces 52 of said connector 10, said lateral surfaces 52 being oriented transversely to said axis of rotation Y. Said projecting shapes 50 are in this case positioned between said flanges 46 and hydraulic connections 44, above conduits 48 connecting said end pieces 42 through which the cleaning liquid passes.

Said projecting shapes may be made in one piece with said lateral surface 52 or, as shown in FIG. 4, with a surface 54 set back from said lateral surface 52 such that said projecting shapes 50 have a bearing portion 56 designed to be in contact with said adaptor 14 and remote from said set-back surface 54. Said connector comprises, in this case, a channel 58, in particular a circular channel, between said lateral surface 52 and said set-back surface 54. In other words, said lateral surface 52 has an orifice 60 which is closed by said set-back surface 54 and through which said projecting shapes 50 protrude.

In the various examples shown, the or said projecting shapes 50 are configured so as to be guided by a circumferential wall 62 of an orifice 64, shown in FIG. 1, of said adaptor 14, said axis of rotation Y passing through said orifice 64. The latter may more precisely be centred on said axis of rotation. Said orifice 64 is advantageously circular.

According to the embodiments of FIGS. 2 to 5, said projecting shapes 50 comprise pegs 70, for example cylindrical pegs. In this case there are three pegs, 120° apart from one another about the axis of rotation Y. At least one of said pegs 70 may have a distal end comprising a chamfer 66.

More generally, said projecting shapes 50 may occupy angular portions separated by angular portions having no projections. Here (FIGS. 2 to 4), the pegs 70 each occupy angular sectors of approximately 40°, separated by planar angular sectors of approximately 80°.

In the embodiment of FIGS. 2 to 4, said pegs 70 are of circular cross section, said pegs 70 being configured so as to be tangential to said circumferential wall of the adaptor.

In the embodiment of FIG. 5, said pegs 70 are of elongate cross section, one portion 68 of a contour of said pegs being configured so as to follow an angular portion of said circumferential wall. The facing regions of the connector 10 and of the adaptor 14, by means of which it is possible to form a pivot, are thus increased, albeit in a limited fashion.

In the embodiments of FIGS. 6 to 9, said projecting shapes 50 comprise one or more branches 72 having ends 74 designed to come to face angularly distant regions of said circumferential wall. This stiffens the pivoting connection.

In the embodiments of FIGS. 6 and 7, the or said branches 72 follow a chord of said orifice. In the embodiment of FIG. 6, said branches 72 form a V which is open towards an upper portion of the connector 10 whereas in the embodiment of FIG. 7 they form a V which is open towards a lower portion of said connector, that is to say that portion by means of which said connector 10 is attached to the stiffening core of the wiper.

In the embodiments of FIGS. 8 and 9, the or said branches 72 follow a diameter of said orifice. They form, for example, an X-shaped cross. In the embodiment of FIG. 8, this is a cross whose branches are at 45° with respect to a direction of longitudinal extent of the wiper. In the embodiment of FIG. 9, this is a cross having one branch parallel to said direction of longitudinal extent and the other orthogonal thereto. It has been observed that such an embodiment is particularly advantageous in terms of resisting the forces experienced by the wiper, during operation.

Other forms and/or distributions of said projecting shapes 50 are of course possible without departing from the scope of the invention.

Said projecting shapes and said orifice in which they are guided may be transposed, respectively, onto said adaptor and said connector.

The invention claimed is:

1. A connector for a windscreen wiper of a motor vehicle, said connector being configured to allow said wiper to be articulated to an arm for driving said wiper in a rotational movement about an axis of rotation, said connector comprising:
   a plurality of projecting shapes that are configured to be guided in rotation by an orifice of an adaptor for said wiper on said arm in various angularly distant regions about said axis of rotation, to allow said movement in rotation,
   wherein the projection shapes are configured to be guided by a circumferential wall of the orifice of said adaptor, said axis of rotation being configured to pass through said orifice, and
   wherein said projecting shapes comprise one or more branches having ends designed to come face to face the angularly distant regions about said axis of rotation of said circumferential wall.

2. The connector according to claim 1, wherein the branches are designed to follow a chord of said orifice.

3. The connector according to claim 1, wherein the branches are designed to follow a diameter of said orifice.

4. A wiper system comprising:
   a windscreen wiper; and
   a connector for said windscreen wiper, said connector being configured to allow said wiper to be articulated to an arm for driving said wiper in a rotational movement about an axis of rotation, said connector including:
   a plurality of projecting shapes that are configured to be guided in rotation by an orifice of an adaptor for said wiper on said arm in various angularly distant regions about said axis of rotation, to allow said movement in rotation,
   wherein the projecting shapes are configured to be guided by a circumferential wall of the orifice of said adaptor, said axis of rotation being configured to pass through said orifice and,
   wherein said projecting shapes comprises one or more branches having ends designed to come to face the angularly distant regions about said axis of rotation of said circumferential wall.

5. The connector according to claim 1, wherein the branches form a V.

* * * * *